| United States Patent | [11] 3,634,071 |

| [72] | Inventors | Henry Rush Spedden;<br>Emil E. Malouf, both of Salt Lake City, Utah |
| --- | --- | --- |
| [21] | Appl. No. | 823,695 |
| [22] | Filed | May 12, 1969 |
| [45] | Patented | Jan. 11, 1972 |
| [73] | Assignee | Kennecott Copper Corporation<br>New York, N.Y. |

[54] PROCESS FOR PRECIPITATING COPPER FROM SOLUTION
10 Claims, 1 Drawing Fig.

| [52] | U.S. Cl. | 75/109, 75/117 |
| --- | --- | --- |
| [51] | Int. Cl. | C22b 15/12 |
| [50] | Field of Search | 75/117, 109 |

[56] References Cited
UNITED STATES PATENTS

| 723,949 | 3/1903 | Van Arsdale | 75/117 |
| 3,117,000 | 1/1964 | Schlain et al. | 75/109 |
| 3,260,593 | 7/1966 | Zimmerley et al. | 75/117 |

*Primary Examiner*—Hyland Bizot
*Assistant Examiner*—G. T. Ozaki
*Attorneys*—John L. Sniado, Mallinckrodt and Mallinckrodt, P. H. Mallinckrodt and Philip A. Mallinckrodt

ABSTRACT: An improved process for accelerating the precipitation of copper from solution. A pregnant leach solution, containing at least copper, ferric, ferrous, and sulfate ions, is treated with sulfur dioxide under conditions of agitation to complex the ferric ions and to efficiently maintain the treated leach solution at a pH below 3.0, without the addition of acid. The complexing of the ferric ions prevents these ions from oxidizing the metallic iron utilized in the precipitation of copper, thereby significantly reducing metallic iron requirements, and, coupled with the maintenance of a lower pH, increasing the amount of copper precipitated.

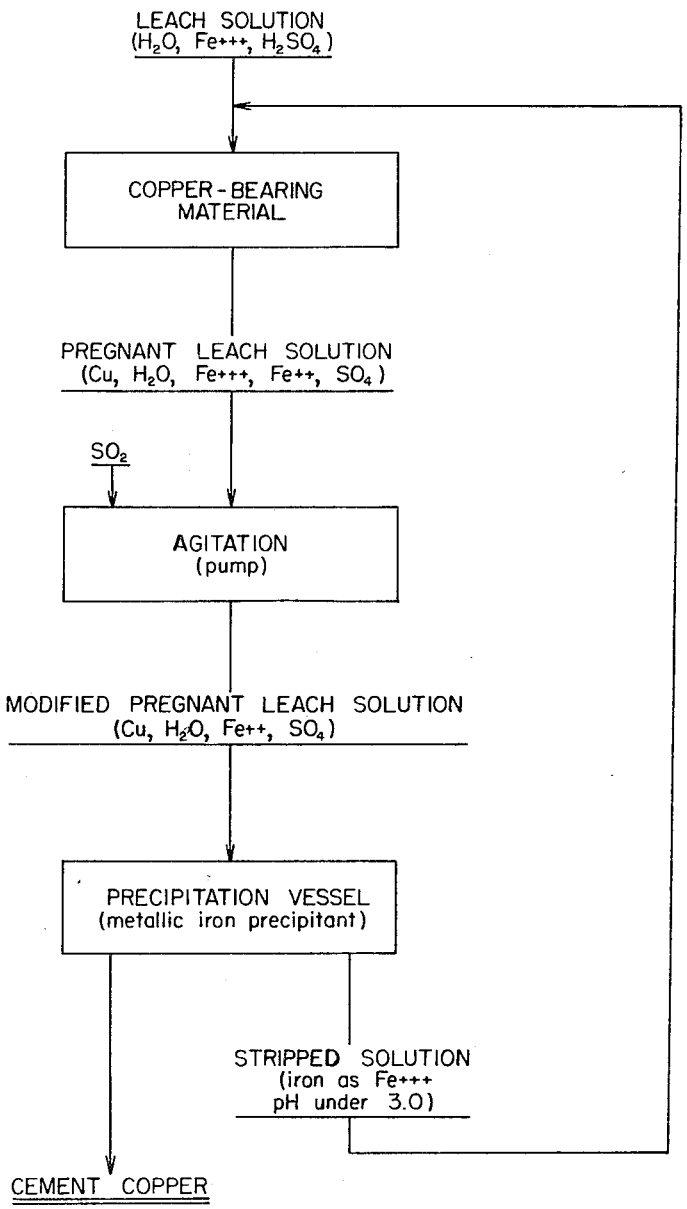

PROCESS FOR PRECIPITATING COPPER FROM SOLUTION

BACKGROUND OF THE INVENTION

1. Field

This invention relates to processes for the precipitation of metals from solution and especially for the precipitation or cementation of copper from pregnant leach solutions.

2. State of the Art

It has long been the practice to precipitate copper from solution by bringing a copper-containing leach solution into contact with a metal which is higher in the electromotive series than copper, most commonly metallic iron. The copper ions are customarily placed in solution by running a weakly acid leach solution, containing ferric and sulfate ions, through a mine dump or by otherwise contacting a copper-bearing material with the solution. The leach solution, pregnant with copper, is brought into contact with metallic iron for precipitating "cement" copper. The stripped leach solution is usually recycled through the copper-bearing material and the entire process repeated until copper values in the material being leached are effectively depleted.

The presence of ferric ions in the leach solution is necessary to put into solution copper from the copper sulfide minerals present in the material being leached. As the copper comes into solution, the ferric ion is reduced to the ferrous ion, which remains unchanged as the copper is precipitated on the metallic iron. Due to normal oxidation and to the fact that the ferric ions present in the leach solution are not always entirely consumed, the pregnant leach solution will normally contain a significant quantity of ferric ions. This is undesirable, because the ferric ions attack the metallic iron used to precipitated the copper from solution and thereby reduce the amount of metallic iron effective for precipitation. In addition, the quantity of solubilized iron in the recycled solution increases, and, over a period of time, the cyclic leaching procedure becomes less efficient due to the accumulation of iron in solution.

The presence of a significant amount of the ferric ion in solution has been recognized in the past as a major problem bearing upon the amount of copper that can be obtained by precipitation from a pregnant leach solution using an economical amount of metallic iron precipitant. Thus, an effort has been made to overcome the difficulty by introducing sulfur dioxide under the surface of a large settling pond containing a leach solution pregnant with copper. However, it required approximately 10 days to reduce the ferric ions. In modern applications, in which time is of the essence and leach solutions are recycled, such a time-consuming procedure is unacceptable.

SUMMARY OF THE INVENTION

The invention provides a process for accelerating the precipitation of copper from solution and for increasing the amount of copper precipitated therefrom by rapidly complexing ferric ions to prevent them from oxidizing metallic iron used in the precipitation of copper. Also, a lower pH is maintained in the leaching solution than would otherwise be possible without the addition of acid.

According to the invention, sulfur dioxide is introduced into a pregnant leach solution and the leach solution is subjected to agitation to form a complex with the ferric ions and to buffer the solution to maintain a low PH, whereupon the solution is brought into contact with metallic iron to precipitate the copper from solution.

The more vigorous and dynamic the agitation the better; this is conveniently accomplished by introducing the $SO_2$ into the pregnant solution at pumps used to pressurize it for injection into precipitation vessels. By such use of sulfur dioxide and its conversion along with related complexes to the sulfate ion, the pH of the leach solution is maintained at a relatively low level, without the addition of acid.

Following the stripping of copper from the solution by precipitation on the metallic iron, the stripped solution is usually recycled through the leaching stage, whereby the acid formed during the process is put to use.

At least six advantages are inherent in the utilization of the process of the invention:

1. The sulfur dioxide forms a complex with the ferric ions, precluding oxidation of the metallic iron by the ferric ions.
2. The complexing of the ferric ions is accomplished rapidly resulting in significant time savings in the precipitation process.
3. The availability of metallic iron for the precipitation of copper from solution is increased.
4. The precipitation of copper is accelerated and the amount of copper precipitated is increased.
5. A beneficial lower pH is maintained within the leach solution.
6. The necessity of adding mineral acid to reduce the pH of the leach solution is eliminated or reduced.

DESCRIPTION OF THE DRAWING

The single FIGURE of the accompanying drawing constitutes a flow sheet representing procedures presently contemplated as the best mode of applying the invention in actual practice.

DESCRIPTION OF THE ILLUSTRATED EMBODIMENT

A pregnant leach solution is formed, for example by leaching copper-sulfide-bearing waste material from a mine or a mill with an aqueous solution of ferric sulfate and sulfuric acid. The acidic solution may be freshly made or may be composed, in whole or in part, of recycled spent solution from the accompanying copper precipitation operation. The pH of the leach solution is preferably adjusted to about pH 1.9 to 2.4 as the solution is introduced into the waste dump or other material being leached, see Zimmerley et al. U.S. Pat. No. 3,260,593.

The resulting, pregnant, leach solution normally contains copper, ferrous, ferric, sulfate, and other ions in solution. The solution is treated with sulfur dioxide and is subjected to agitation, usually both prior to and during precipitation of the copper values. The desired agitation is conveniently achieved through use of the apparatus disclosed in the Back et al. U.S. Pat. No. 3,154,411 or in the Zimmerly et al. U.S. Pat. No. 3,333,953, wherein the pregnant solution is injected into one or more precipitation vessels under pressure provided by pumping.

The copper values in the treated leach solution are precipitated by exposure to metallic iron and are separated from the stripped leach solution by appropriate means known to the art. In precipitation processes without prior treatment of the leach solution with sulfur dioxide, the pH of the solution during precipitation of the copper normally rises above pH 3.0 to a pH of 3.5. The treatment of the pregnant leach solution with sulfur dioxide in accordance with this invention maintains the pH of the solution below 3.0 and at or near the original pH of the heading leach solution, depending on the amount of sulfur dioxide added to the solution and the concentration of ferric ions. The stripped solution can be recycled to the leaching stage with little or no addition of acid to adjust the pH.

In practicing the process of the invention, it is important that the sulfur dioxide be mixed with the pregnant leach solution under conditions of vigorous agitation. It has been found that the addition of sulfur dioxide to pregnant solution being injected into the dynamic copper precipitation vessels of the Back et al. patent or the Zimmerley et al. patent mentioned above can take place at the pumps which pressurize the pregnant leach solution being injected into such vessels. The agitating action of the pumps themselves and the vigorous agitation of the solution as it is injected into and surges and swirls in the vessels results in intimate contact of the sulfur dioxide with the ferric ions present in the solution and in complexing them prior to reaction with the metallic iron.

It is, of course, desirable to complex as many of the ferric ions as possible. It has been found that an amount of sulfur dioxide stoichiometrically equivalent to the concentration of ferric ions can complex substantially all the ferric ions in not more than 120 minutes reaction time. However, smaller amounts of sulfur dioxide may be added to effect correspondingly reduced complexing of the ferric ions, in which event correspondingly reduced savings in consumption of the metallic iron precipitant will be realized. In all instances, saving in consumption of iron results in a corresponding increase in the amount of copper precipitated by use of a given quantity of the iron precipitant.

In the absence of sulfur dioxide for the complexing of ferric ions, significant amounts of hydrogen ion are consumed during the precipitation of copper, and the pH of the solution rises to approximately 3.5 from its initial pH. However, when sulfur dioxide is added in accordance with the invention, conversion of the sulfur dioxide to the sulfate ion buffers the solution and maintains a lower pH range as well as accelerating the precipitation of copper.

It is of significance to note that an equivalent reduction in pH achieved through the addition of sulfuric acid required the addition of greater amounts of sulfuric acid than the sulfuric acid equivalent of the sulfur dioxide added to the solution. This means that the use of sulfur dioxide results in acidity beyond that which would be accomplished by converting the equivalent amount of sulfur dioxide into sulfuric acid. Although the exact mechanism effecting this phenomenon is not known, the following reactions are postulated as being the probable reactions with sulfur dioxide:

Approximately 50 percent of the ferric ion contained in the copper-bearing solution, which has a pH range of 2.4 to 2.7, enters the precipitation area as a ferric hydroxy sulfate or ferric hydroxide, $Fe(OH)SO_4$ or $Fe(OH)_3$. The addition of sulfur dioxide to this leach solution results in several reactions, among which is the formation of the complex

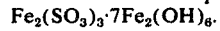
$$Fe_2(SO_3)_3 \cdot 7Fe_2(OH)_6.$$

The sulfur dioxide reacts with water in the solution to produce sulfurous acid, $H_2SO_3$. The sulfurous acid reacts with the ferric hydroxy sulfate and the ferric hydroxide to produce the complex

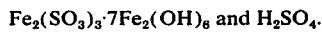
$$Fe_2(SO_3)_3 \cdot 7Fe_2(OH)_6 \text{ and } H_2SO_4.$$

This results in the production of sulfuric acid during the neutralization of the ferric hydroxide.

By way of comparison, if sulfuric acid rather than sulfur dioxide were added to the solution, the reaction would be a straightforward neutralization of the ferric hydroxide with sulfuric acid to form ferric sulfate and water.

The remainder of the ferric ions not in the form of the hydroxide or hydroxy sulfate are presumably reduced to the ferrous state by the sulfur dioxide, such reduction being understood as forming part of the concept herein identified as "complexing."

In addition to the foregoing reactions there is also a very common reaction involving the ferrous ion. The addition of sulfur dioxide to the solution forms ferrous sulfite. With the continued addition of sulfur dioxide the ferrous sulfite is converted to ferrous acid sulfite, which reacts in solution as an acid, thereby lowering the pH.

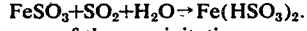
$$FeSO_3 + SO_2 + H_2O \rightarrow Fe(HSO_3)_2.$$

Although the use of the precipitation apparatus heretofore referred to is preferred for providing vigorous agitation of the pregnant solution following the introduction of the sulfur dioxide, other means can be employed. For example a conventional precipitation launder can be used together with means therein for vigorously agitating the solution, or the pregnant solution and the sulfur dioxide can be agitated prior to introduction into the launder or other precipitation vessel. It should be noted, however, that oxygen (as in the air) must be excluded from the launder and that, even with the precipitation apparatus previously mentioned, care should be taken to exclude the introduction of air with the solution, as by maintaining the pumps well packed and by not letting the level of solution in any sump from which the solution is pumped drop below the intake level of the pump.

The amount of time necessary to complex the ferric ions during agitation depends on the quantity of the ferric ion in solution and the amount of sulfur dioxide added. Periods of time have been recorded varying from 5 minutes to 30 minutes with vigorous agitation. Up to 120 minutes may be required for complete conversion of the ferric ions to ferrous ions.

The following examples are typical of the application of the process of the invention, but should not be construed as limiting the scope of the invention:

EXAMPLE I

Sulfur dioxide was added to the pregnant leach solution to reduce 25 percent of the concentration of ferric ion present in the solution. The sulfur dioxide was added at the pumps leading to a copper precipitation cone as disclosed in the Zimmerley et al. U.S. Pat. No. 3,333,953, in which shredded metallic iron was used as the precipitant. The sulfur dioxide was agitated for a period of six minutes in the precipitation cone and resulted in a savings of 0.3 pound of iron per pound of copper precipitated. In addition, the acid requirement for the buffering of the solution to a pH of 2.1 was reduced from 15 pounds to 9 pounds per thousand gallons. A noticeably more effective and rapid precipitation of the copper resulted.

EXAMPLE II

In tests conducted without prior ferric ion complexing, the pH of the stripped solution discharged from the precipitation cone was 3.0. In order to adjust the pH of the solution to 2.1, 14.1 pounds of sulfuric acid per thousand gallons of solution were required.

In a second series of tests, the ferric ion concentration in the pregnant leach solution before treatment was approximately 8.4 pounds per thousand gallons, and 4.4 pounds per thousand gallons sulfur dioxide were added to treat the solution. The sulfuric acid equivalent of the sulfur dioxide added was 6.8 pounds of sulfuric acid per thousand gallons of solution. The pH of the stripped solution was 2.06. Sulfuric acid was therefore not required to adjust the pH to the 2.1 value. The indicated acid savings by the addition of sulfur dioxide to complex the ferric ions was 7.3 pounds of sulfuric acid per thousand gallons.

EXAMPLE III

In the same series of tests conducted in example 2 above, when the ferric ion concentration was increased to 16.7 pounds per thousand gallons, 8.8 pounds of sulfur dioxide per thousand gallons of solution were required. The sulfur dioxide value was equivalent to 13.6 pounds of sulfuric acid per thousand gallons. With the higher ferric ion concentration, the sulfuric acid savings dropped to 0.5 pounds per thousand gallons.

Several laboratory tests were conducted to show the effect of sulfur dioxide conditioning on copper-bearing solutions in accelerating the precipitation of copper. In table 1 below a comparison is made of nonconditioned solutions and solutions conditioned with sulfur dioxide, in which the percentage of copper precipitated and the precipitation time are compared. In both instances the stirring speed was 400 revolutions per minute.

TABLE 1

Laboratory data showing the effect of sulfur dioxide conditioning on copper-bearing solutions in accelerating the precipitation of copper (Stirring speed 400 r.p.m.)

| Precipitation time, mins. | SO₂ conditioning time, mins. | Weight percent copper precipitated |
|---|---|---|
| Non-conditioned solutions | | |
| 1.50 | None | 61.6 |
| 3.00 | None | 90.0 |
| 9.00 | None | 97.6 |

Table I—Continued
Sulfur dioxide conditioned solutions

| 1.17 | 10 | 45.2 |
| 1.50 | 10 | 91.0 |
| 1.50 | 10 | 86.6 |
| 1.50 | 10 | 91.0 |

In table II below a comparison is made of the pounds of sulfur dioxide added to pregnant solution being pumped at the rate of 2,000 gallons per minute into the precipitation vessel to shift the pH of heading solution. This table shows the effect of sulfur dioxide additions in shifting the pH of leach solutions.

TABLE II

Pounds of sulfur dioxide added to 2000 g.p.m. of copper-bearing solution

| Pounds of $SO_2$ per hour | Weight percent $Fe^{+++}$ complexing | pH of heading solution | | pH of tailing solution | |
| --- | --- | --- | --- | --- | --- |
| | | Without $SO_2$ | With $SO_2$ | Without $SO_2$ | With $SO_2$ |
| 200 | 20 | 2.46 | 2.38 | 3.15 | 3.00 |
| 300 | 23 | 2.45 | 2.25 | 3.15 | 2.88 |
| 400 | 26 | 2.43 | 2.07 | 3.15 | 2.72 |
| 400 | 33 | 2.40 | 2.00 | 3.15 | 2.45 |

Whereas this invention is illustrated and described with respect to presently preferred procedures, it should be realized that the invention is not restricted thereto.

We claim:

1. An improved process for accelerating the precipitation of copper values from a pregnant leach solution containing copper, ferric, ferrous and sulfate ions, and for maintaining a low pH in the system, comprising the steps of:

introducing sulfur dioxide into the pregnant leach solution under conditions of agitation and substantially in the absence of oxygen to rapidly complex ferric ions in solution;

bringing the so-treated solution into contact with metallic iron to precipitate copper values, while maintaining the pH below 3.0; and separating the precipitate copper values from the stripped solution.

2. A process as set forth in claim 1, wherein following separation of the precipitated copper values, the stripped solution is again made pregnant with copper values by passage through a leaching stage and is the recycled through the process.

3. A process as set forth in claim 2, wherein a substantially stoichiometric amount of sulfur dioxide is added to the pregnant leach solution, calculated upon the amount of ferric ion in solution.

4. A process as set forth in claim 2, wherein the sulfur dioxide is introduced into the pregnant leach solution at pumps utilized to force the solution into a precipitation vessel.

5. A process as set forth in claim 4, wherein the pumped solution is introduced into the precipitation vessel under conditions of dynamic agitation.

6. A process as set forth in claim 2, wherein sulfur dioxide is introduced in a amount which brings the pH of the stripped solution to between about pH 1.9 and 2.4.

7. A process as set forth in claim 6, wherein the pH of the stripped solution is brought to about pH 2.1.

8. A process as set forth in claim 1, wherein a substantially stoichiometric amount of sulfur dioxide is added to the pregnant leach solution, calculated upon the amount of ferric ion in solution.

9. A process as set forth in claim 1, wherein the sulfur dioxide is introduced into the pregnant leach solution at pumps utilized to force the solution into a precipitation vessel.

10. A process as set forth in claim 9, wherein the pumped solution is introduced into the precipitation vessel under conditions of dynamic agitation.

* * * * *